(12) United States Patent
Baird

(10) Patent No.: US 12,174,458 B2
(45) Date of Patent: Dec. 24, 2024

(54) EYE-WEAR KIT WITH MAGNETIC FRONT ATTACHMENT AND METHOD OF USE

(71) Applicant: Katie Baird, Pensacola, FL (US)

(72) Inventor: Katie Baird, Pensacola, FL (US)

( * ) Notice: Subject to any disclaimer, the term of this patent is extended or adjusted under 35 U.S.C. 154(b) by 670 days.

(21) Appl. No.: 17/307,360

(22) Filed: May 4, 2021

(65) Prior Publication Data

US 2021/0325692 A1 Oct. 21, 2021

Related U.S. Application Data

(63) Continuation-in-part of application No. 15/915,231, filed on Mar. 8, 2018, now abandoned.

(51) Int. Cl.
G02C 5/00 (2006.01)
A45F 5/00 (2006.01)
G02C 3/04 (2006.01)

(52) U.S. Cl.
CPC .............. *G02C 5/008* (2013.01); *A45F 5/00* (2013.01); *G02C 3/04* (2013.01); *A45F 2200/0541* (2013.01); *G02C 2200/02* (2013.01)

(58) Field of Classification Search
CPC ........ G02C 5/128; G02C 5/126; G02C 5/006; G02C 5/08; G02C 5/04; G02C 5/02
See application file for complete search history.

(56) References Cited

U.S. PATENT DOCUMENTS

| | | | |
|---|---|---|---|
| 6,168,273 B1 * | 1/2001 | Dupraz | G02C 3/04 351/158 |
| 6,206,258 B1 | 3/2001 | Calder | |
| 7,014,313 B1 * | 3/2006 | Lee | G02C 9/04 351/57 |
| 7,048,372 B1 * | 5/2006 | Cohen | G02C 9/04 351/44 |
| 10,054,804 B1 * | 8/2018 | Langford | G02C 11/00 |
| 10,634,931 B1 | 4/2020 | Zargari | |
| 2005/0264754 A1 * | 12/2005 | Cody | G02C 11/08 351/92 |
| 2006/0055866 A1 * | 3/2006 | Dietz | G02C 11/00 351/41 |
| 2007/0064196 A1 * | 3/2007 | Avery | G02C 11/00 351/112 |

(Continued)

OTHER PUBLICATIONS

International Search Report and Written Opinion mailed Nov. 16, 2021, directed to International Patent Application No. PCT/US2021/044136; 9 pages.

*Primary Examiner* — Christopher Stanford
*Assistant Examiner* — Journey F Sumlar
(74) *Attorney, Agent, or Firm* — Michele V. Frank; Venable LLP

(57) ABSTRACT

Eyewear or glasses with a frame having a frame front and two temples. Frame front has a bridge between two sides. At least one primary magnet is embedded in frame of eyeglasses. A length of material having a first side and a second side has at least one secondary magnet. Length of material is fixed to a larger object such that at least one secondary magnet is facing away from the object. To store one's glasses, the wearer places the frame of the glasses proximate primary magnet against a secondary magnet so that the glasses are held magnetically (by way of magnetic forces) to the length of material and, in turn, to the larger freestanding object. The glasses can be removed and stored in this manner repeatedly.

20 Claims, 8 Drawing Sheets

(56) References Cited

U.S. PATENT DOCUMENTS

| | | | | |
|---|---|---|---|---|
| 2008/0105798 A1* | 5/2008 | Jongebloed | ............ | A47F 7/021 |
| | | | | 248/176.1 |
| 2013/0258269 A1* | 10/2013 | Shalon | .................. | G02C 5/008 |
| | | | | 351/79 |
| 2014/0368784 A1* | 12/2014 | Rubin | ..................... | G02C 5/20 |
| | | | | 351/63 |
| 2015/0077695 A1* | 3/2015 | Rattelade | ................. | G02C 5/02 |
| | | | | 351/47 |
| 2018/0074342 A1* | 3/2018 | Boedecker | ............. | G02C 5/006 |
| 2018/0252938 A1* | 9/2018 | Thorsell | ................... | G02C 5/22 |
| 2018/0335641 A1* | 11/2018 | Ernica | ..................... | G02C 9/04 |

\* cited by examiner

EYE-WEAR KIT WITH MAGNETIC FRONT ATTACHMENT AND METHOD OF USE

CROSS-REFERENCES TO RELATED APPLICATIONS

This non-provisional patent application is a continuation-in-part of application Ser. No. 15/951,231. The prior application listed the same inventors as the present application

STATEMENT REGARDING FEDERALLY SPONSORED RESEARCH OR DEVELOPMENT

Not Applicable

MICROFICHE APPENDIX

Not Applicable

BACKGROUND OF THE DISCLOSED TECHNOLOGY

Glasses are expensive and often take days or weeks to replace unless one wants to pay even more money to replace a lost or damaged piece of eyewear. Smaller frame eyewear can further be damaged or bent easily while lens can be scratched. Those with small children, pets, or are simply clumsy have seen their glasses trampled upon, kicked aside, or topped by other objects.

When putting down one's glasses, for example, when going to sleep, one may put them in a case but, for some of us, this is not worth the bother and can lead to scratching anyway. This is assuming one can find where they left their case among dozens of other things which might be on a night table or part of a bedtime routine.

What is needed is a place to safely put one's glasses to avoid damage or loss thereof. This storage place should ideally be in a fixed location so that this too isn't lost or misplaced. The storage space must also be easy to use for those who already find using a storage case to be trouble or unhelpful in preventing damage or loss. These and other prior art problems are solved by embodiments of the disclosed technology described herein.

SUMMARY OF THE DISCLOSED TECHNOLOGY

An eyewear kit of embodiments of the disclosed technology includes a piece of eyewear (e.g. glasses, sunglasses, goggles, or the like) with a primary magnet (or magnets) embedded in the frame of the eyewear. This primary magnet can be hidden from view, built into the frame of the glasses itself, centered between the left and right sides, and/or having a circular front shape. The kit also includes a length of material with a plurality of secondary magnets (spaced apart from each other, hidden within a strip of material, or otherwise) on a first side of the strip of material. An attachment mechanism is (at least) on an opposite second side of this first side, the attachment mechanism being a buckle, loop, portal, sticky surface, or combination or equivalent thereof.

The length of material is affixed to a larger object and a front of the eyewear can face this larger object when the primary magnet embedded within the frame is magnetically held to one of a plurality of secondary magnets of the length of material. The "larger object" is one which extends in at least one dimension which is at least two times longer than a longest dimension of the eyewear itself. In some embodiments, the length of material is wrapped around the larger object (including a portion thereof, such as a bed post, pole, or the like) and attached to itself (such as via buckle or strap). In others, the length of material is kept stretched out linearly and flat against the larger object (such as against a wall) where it might be attached via an adhesive backing or a fastener. When against a wall, for example, the length of material might be attached to, above and in parallel to, on a wall of, etc., another organization or storage device such as a series of coat hangers, shelf, bookcase, or cabinet.

The primary magnet within the frame of the present eyewear and secondary magnet of the length of material to which it is attached can both be circular and may have substantially or exactly identical circumferences. That is, the magnets which attach to each other can be the same size. In other embodiments, the primary and secondary magnets can vary in size from one another. Only one need be primarily magnetic (a permanent magnet) while the other can be magnetizable (temporarily) by a permanent magnet.

A method of placing eyewear, such as the above-described eyewear, can be carried out by (in order or in another order) attaching a length of material with a single secondary magnet or a plurality of secondary magnets on a first side thereof to a larger object than the length of material. In another step, present eyewear is provided, the eyewear having a primary magnet embedded within the frame of the eyewear (a "frame" being defined as "the framework for a pair of eyeglasses, made up of the frame front and two protrusions known as temples"). The primary magnet of the eyewear is magnetically engaged (removably attached and/or connected) with one secondary magnet of the first side of the length of material. When attached, the outer side of the eyewear ("outer side" is defined as a side of the eyewear which faces outward away from a face or head of a person wearing the glasses) faces the length of material.

The attaching to a larger object, in some embodiments, is carried out by wrapping the length of material around a length of the larger object and securing the length of material to itself. In other embodiments, the attaching is carried out by affixing substantially or fully an entire side of the length of material to the larger object. The entire side which is attached to the larger object is, in embodiments of the disclosed technology, a second side opposite the first side with said secondary magnet(s). The length of material can be parallel with a separate storage or organization device in some embodiments. The primary magnet(s) of the present eyewear can be fully hidden within the frame of the eyewear, such that the primary magnet(s) are invisible to an observer.

Any device or step to a method described in this disclosure can comprise, or consist of, that which it is a part of, or the parts which make up the device or step. The term "and/or" is inclusive of the items which it joins linguistically, and each item by itself. Any object described can be as described or "substantially" as such wherein "substantially" is defined as "at least 95% true" or "at least 95% of the amount specified."

Figure 1:
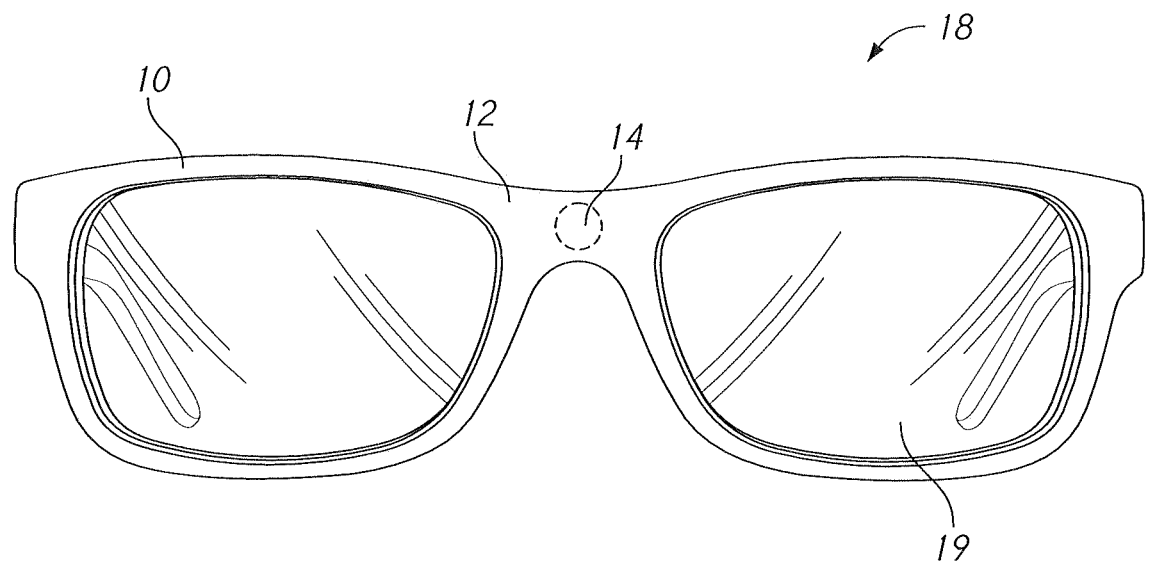
FIG. 1 is a front perspective view, showing the present eyewear with a primary magnet used in an embodiment of the disclosed technology.

REFERENCE NUMERALS IN THE DRAWINGS 10 frame front
12 bridge
14 primary magnet
16 temple
18 frame
19 lenses
20 length of material
21 non-adhesive layer
22 buckle
23 adhesive back
24 belt loop area
25 secondary magnet
26 punch hole
27 tongue
28 extreme end
29 extreme end
30 object

DETAILED DESCRIPTION OF EMBODIMENTS OF THE DISCLOSED TECHNOLOGY

Eyewear kit and/or eyewear accessories with eyewear (glasses) and a length of material. Eyewear or glasses with a frame have a primary magnet embedded within this frame, positioned on frame of eyewear such that at least one pole of primary magnet faces outward (away from, or opposite, a wearers face and/or head). A length of material including a secondary magnet or series of spaced apart secondary magnets is attached to a larger object such as a wall, cabinet, car dash board/console, or furniture with, for example, secondary magnets in-line with each other or circumferentially wrapped around the larger object. To store one's glasses, the wearer places the portion of frame proximate primary magnet of the present pair of eyeglasses against a secondary magnet so that the present glasses are held magnetically (by way of magnetic forces) to the length of material and, in turn, to the larger object. Thus, the larger object has a weight and dimensions such that it is capable of supporting the full weight of the present glasses. The object is freestanding—in other words, the object does not have to be attached to or supported by another object. To support the full weight of a pair of glasses, larger object must be at least two times the weight of a pair of glasses. However, object may be much heavier than a pair of glasses. As an example, a pair of glasses is typically 25-50 grams, whereas objects described herein include a nightstand, which would typically weigh 20-80 lbs. The reader will appreciate that object can be 500 times heavier (or more) than a typical pair of glasses. Generally, this object is stationary or "substantially stationary" meaning large enough that it typically remains in one place, such as a nightstand, bed frame or console in a vehicle (although the vehicle is mobile, the console does not move around within the vehicle). In use, the present glasses must be capable of being suspended from object solely by the magnetic force between the primary and secondary magnet. The present glasses can be removed and stored in this manner repeatedly.

Embodiments of the disclosed technology are described below, with reference to the figures provided.

FIG. 1 shows a front view of present eyewear with a primary magnet used in an embodiment of the disclosed technology. The present eyewear (a device designed to cover the eyes and be supported, at least in part, by the nose) generally has a frame 18 and lenses 19. Lenses 19 are mounted within frame 18. Frame 18 has a frame front 10, which has a first end and second end (furthest point widthwise on either end), is placed in front of a wearer thereof. Two temples 16 are connected in a hinged manner to each end of frame front 10. Frame front 10 includes bridge 12, an area the connects the frame together between the two lenses 19. Bridge 12 is narrower than the left and right sides of the frame front 10. Bridge 12 is typically adapted to be placed over and supported by a wearer's nose there-below. In one embodiment, primary magnet 14 is positioned at a center point of bridge 12 (all directions, when used in this disclosure, being from the perspective of someone who would wear the eyewear in a typical manner known in the art). Primary magnet 14 can be visible when looking at the front side of the present glasses or invisible/hidden from view such as due to being formed within or placed behind a layer of bridge 12 of frame front 10. However, in embodiments of the disclosed technology magnetic force is capable of extending through the front side of the frame 18 to attach magnetically another device to frame 18 and/or primary magnet 14 due to the magnetic force or magnetism of primary magnet 14. Primary magnet 14 can be any shape or size, so long as primary magnet 14 does not extend beyond the perimeter of frame 18. Generally, frame 18 has an outward facing side (frame front and outer portion of temples) and an inward facing side (that side that would be touching or facing the wearer when wearing the glasses). Primary magnet 14 must be oriented such that primary magnet 14 and secondary magnet 25 (described herein) can connect together by magnetic force. Generally, this means that a pole of primary magnet 14 is facing outward.

Figure 2:
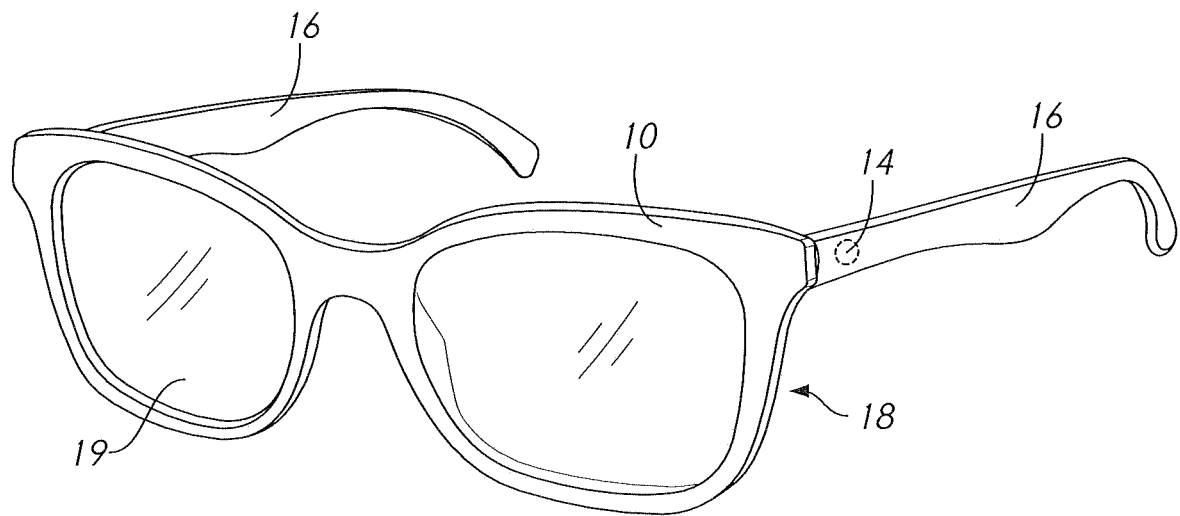
FIG. 2 is a perspective view, showing the present eyewear.

FIG. 2 shows a side view of present eyewear with primary magnet 14 used in an embodiment of the disclosed technology. Primary magnet 14 is positioned at a left point of temple 16 and embedded therein, such that primary magnet 14 is fixed firmly in the surrounding mass of frame 18. Primary magnet 14 can be visible when looking at the side of the present glasses or invisible/hidden from view such as due to being fully formed within or placed behind a layer of temple 16. However, in embodiments of the disclosed technology wherein a layer of temple 16 covers primary magnet 14, magnetic force is capable of extending through the layer of temple 16 to attach magnetically another device to temple 16 and/or primary magnet 14 due to the magnetic force or magnetism of primary magnet 14. Additionally, in one embodiment portions of the frame itself could be magnetic.

Figure 3:
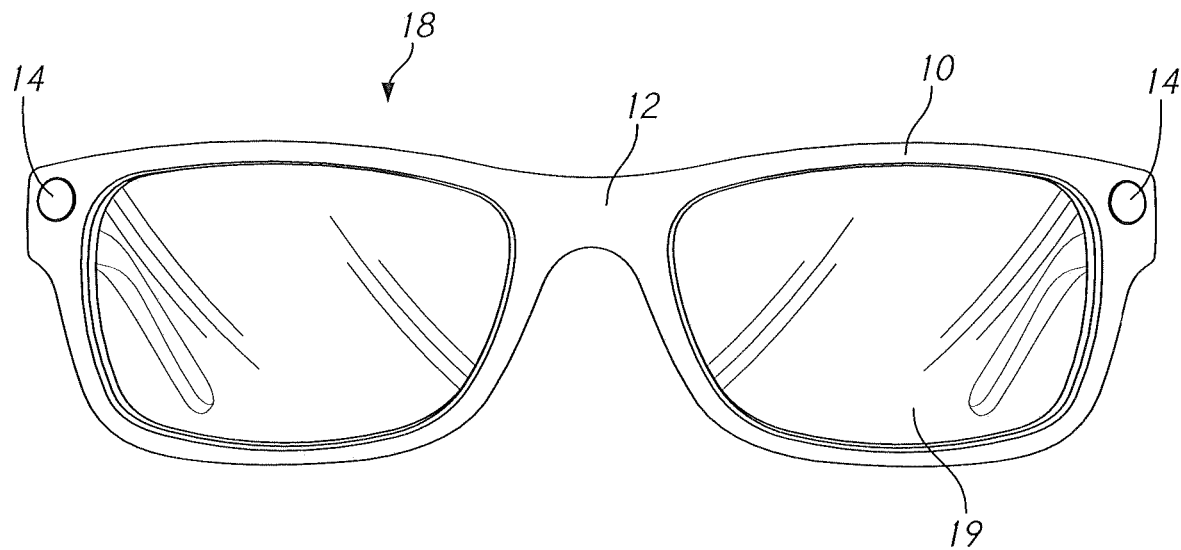
FIG. 3 is a front perspective view, showing the present eyewear.
Figure 4:
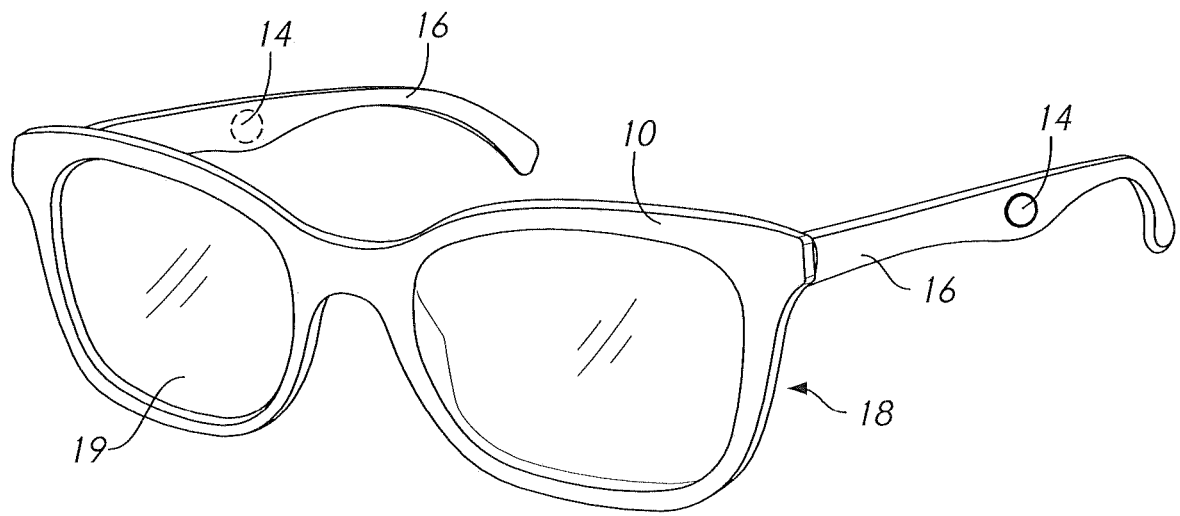
FIG. 4 is a perspective view, showing the present eyewear.

As illustrated in FIGS. 3 and 4, any number of primary magnets 14 can be positioned on and embedded within frame 18. The reader will also appreciate that the exact position of primary magnets 14 on frame 18 is not limited. However, primary magnets 14 must be oriented such that at least one pole of a primary magnet 14 faces outward (in the direction opposite head of wearer), thereby allowing vertical, outward facing surface of frame 18 to magnetically engage with secondary magnet 25 (described herein). FIG. 3 illustrates at least two primary magnets 14 embedded in frame front 10, positioned on each forward-facing end of frame front 10. It is in this manner that a wearer is not required to identify which end of frame front 10 includes primary magnet 14 before aligning frame 18 with secondary magnet 25 to magnetically engage eyeglasses with length of material 20 (shown in FIG. 11, for example).

Similarly, FIG. 4 shows at least two primary magnets 14 on frame 18. Here, primary magnets 14 are embedded in left and right temple 16 of frame 18, positioned around the mid-point of each temple 16. Again, a wearer may fold the temples of glasses in any manner and still successfully align frame 18 with secondary magnet 25 for magnetic engagement (shown in FIG. 11, for example).

Figure 5:
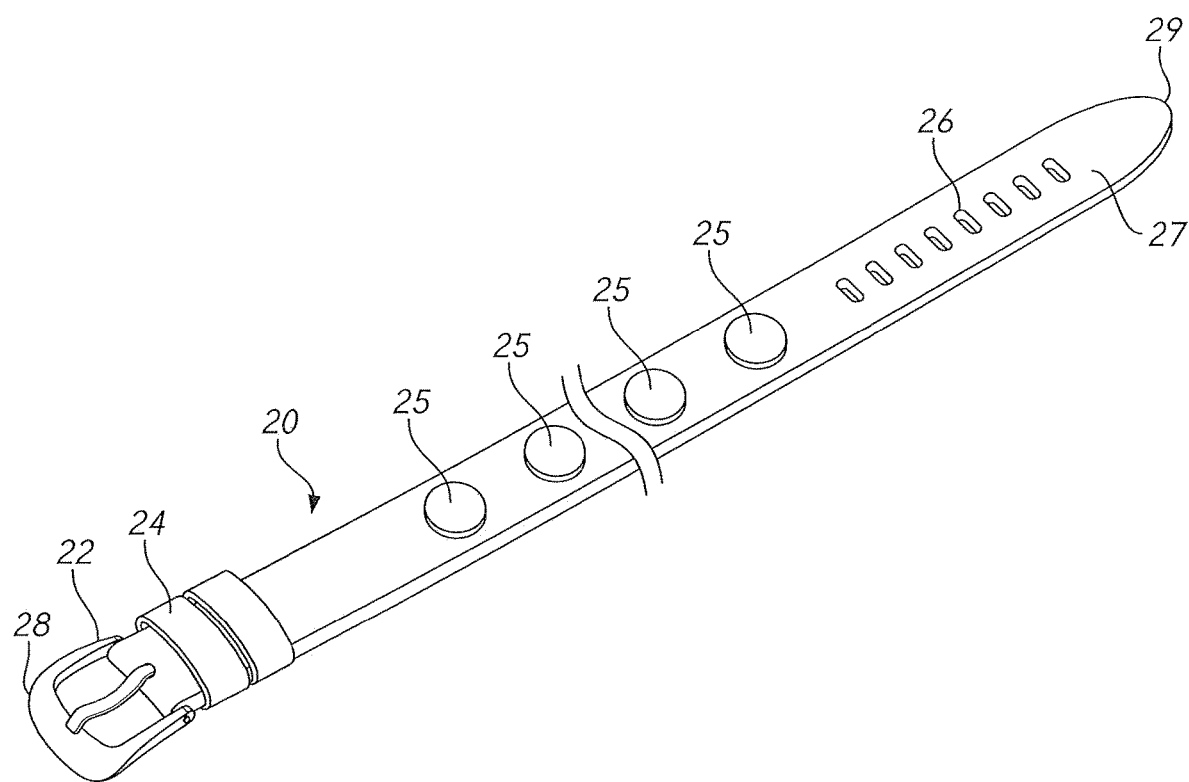
FIG. 5 is a perspective view, showing a length of material with secondary magnets used with the present eyewear in an embodiment of the disclosed technology.

FIG. 5 shows length of material 20 with a series of secondary magnets 25 used with present eyewear in an embodiment of the disclosed technology. Here, length of material 20 is a band with a buckle 22 and belt loop area 24 where the tongue 27 passes through and is attached by way of the punch hole 26. Between the attachment regions (punch holes 26 and belt loop area 24) are one or a plurality of secondary magnets 25 which can be exterior to length of the material 20, flush with a surface of the length of material, or under the surface of length of material 20. Length of material 20 has extreme ends 28 and 29 which are at opposite tips of the longest directional length of the material 20 when it is laid out flat, such as shown in FIG. 5. These tips can move past each other to form a loop around a larger object.

Figure 6:
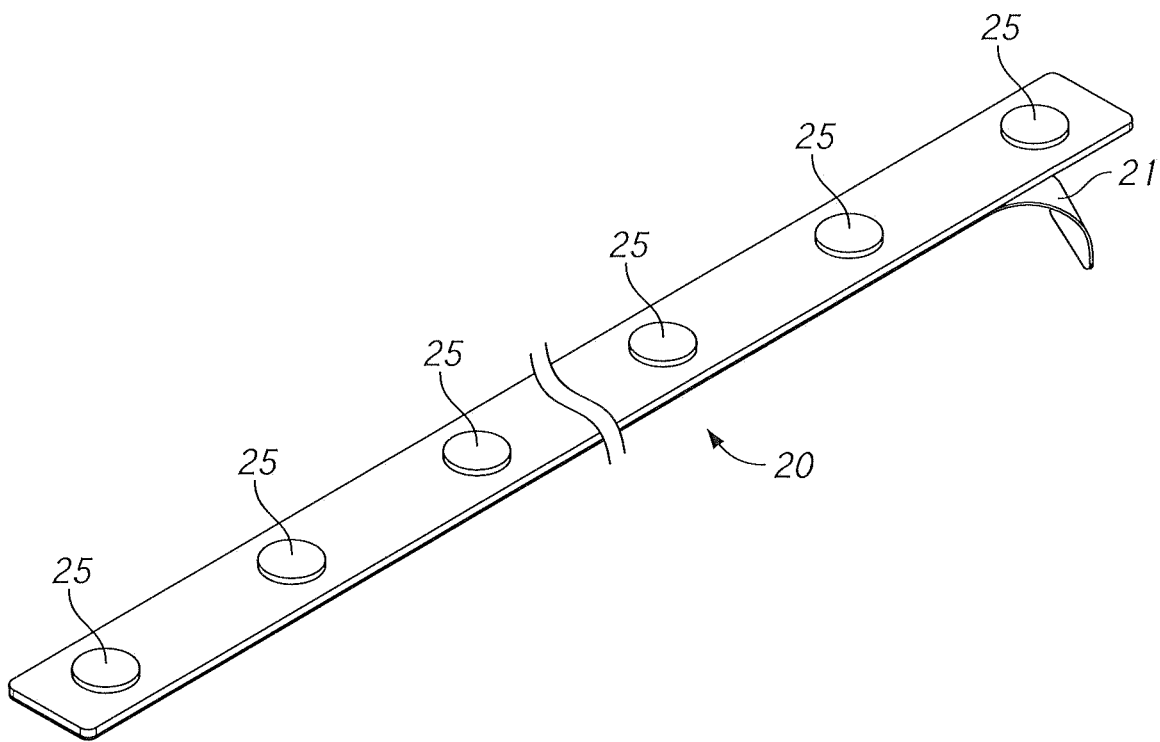
FIG. 6 is a front perspective view, showing a length of material with secondary magnets and adhesive backing of an embodiment of the disclosed technology.
Figure 7:
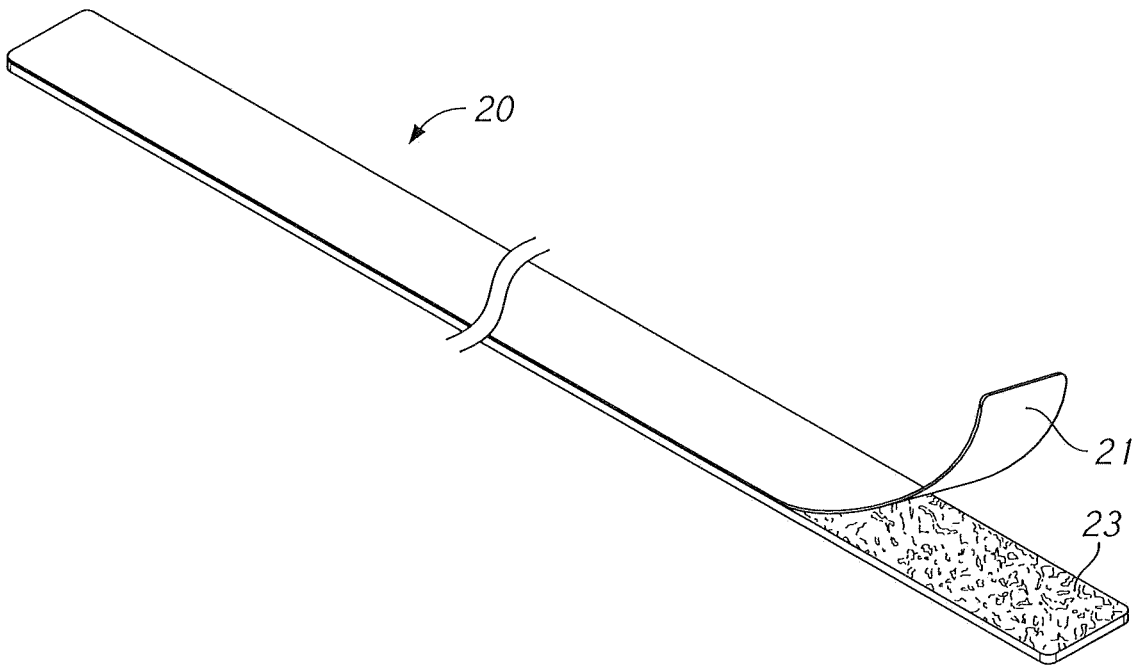
FIG. 7 is a rear perspective view, showing the length of material with secondary magnets and adhesive backing of FIG. 6.

FIGS. 6 and 7 show length of material 20 with a series of secondary magnets 25 of an embodiment of the disclosed technology. Length of material 20 has a first side and second side (front and back of length of material 20). FIG. 6 shows a front view of first side of length of material 20 with magnets, while FIG. 7, a rear view, illustrates adhesive back 23 on second side of length of material 20. Length of material 20 has spaced apart magnets 25 along its entire length as well as an adhesive back 23 and a removable non-adhesive layer 21 which when removed reveals adhesive back 23. Adhesive back 23 can then be attached to a larger object by surrounding the object or extending circumferentially around a portion of the object 30. Alternatively, length of material 20 can be adhered to a surface of larger object 30 in a linear manner such that the extreme left and right sides (the furthest two points from each other on the length of material 25 when the band is laid flat) and the length between them lie in the same XY plane. It should be understood that the length and width of length of material 20 can vary as well as the number of magnets where there can be one or a plurality of secondary magnets 25. For example, length of material 20 used for a bed post can be wider and longer and have more secondary magnets 25 than a version thereof used for a dashboard of a car which may have a single secondary magnet 25. In embodiments of the disclosed technology, the same eyewear is used, at different times, with secondary magnet 25 on a bedpost and secondary magnet 25 on a dashboard or other length of material attached to any of the objects listed above. It should be understood that the "length of material" is just the carrying mechanism for secondary magnet(s) 25 and can consist of adhesive back 23 with non-adhesive layer 21 as shown in FIG. 7. In this manner, when the non-adhesive layer 21 is removed, the magnet 25 is placed in any desired location such as the dashboard of a car and held in place by adhesive back 23. The reader will also appreciate that any known method of attaching length of material 20 to larger object 30 can be used. For example, second side of length of material 20 can include hooks that are designed to attach to loops on object 30.

Figure 8:
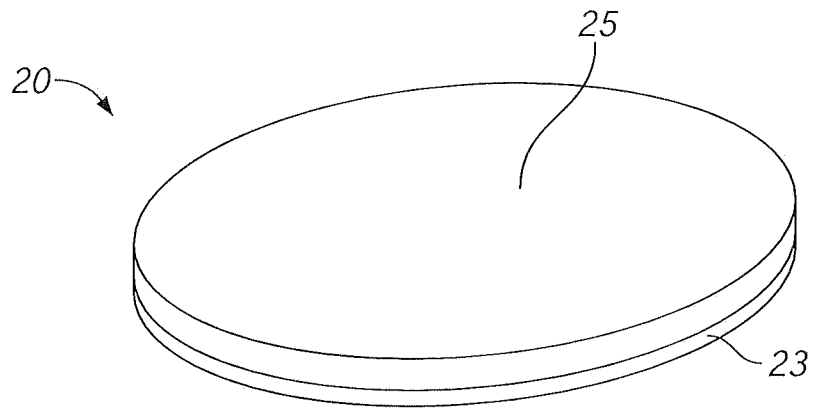
FIG. 8 is a front perspective view, showing a length of material with one secondary magnet and adhesive backing of an embodiment of the disclosed technology.
Figure 9:
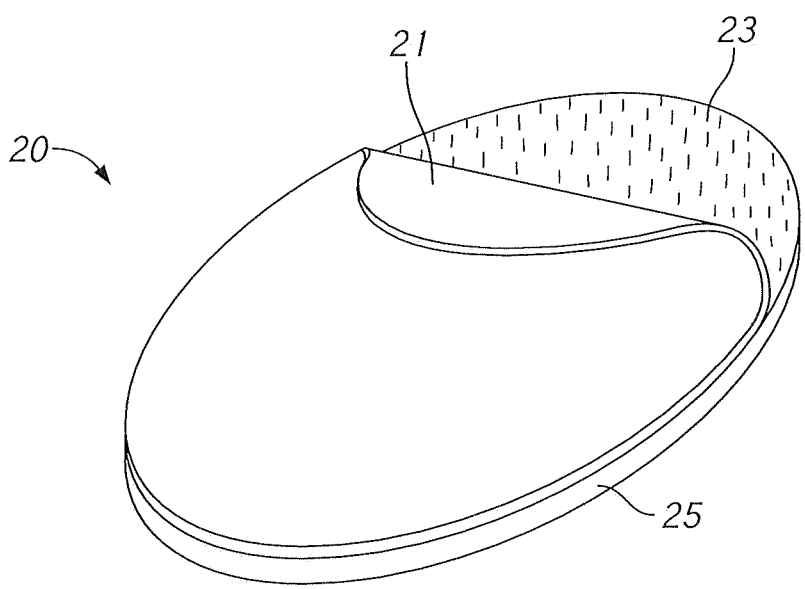
FIG. 9 is a rear perspective view, showing the length of material with one secondary magnet of FIG. 8.
Figure 12:
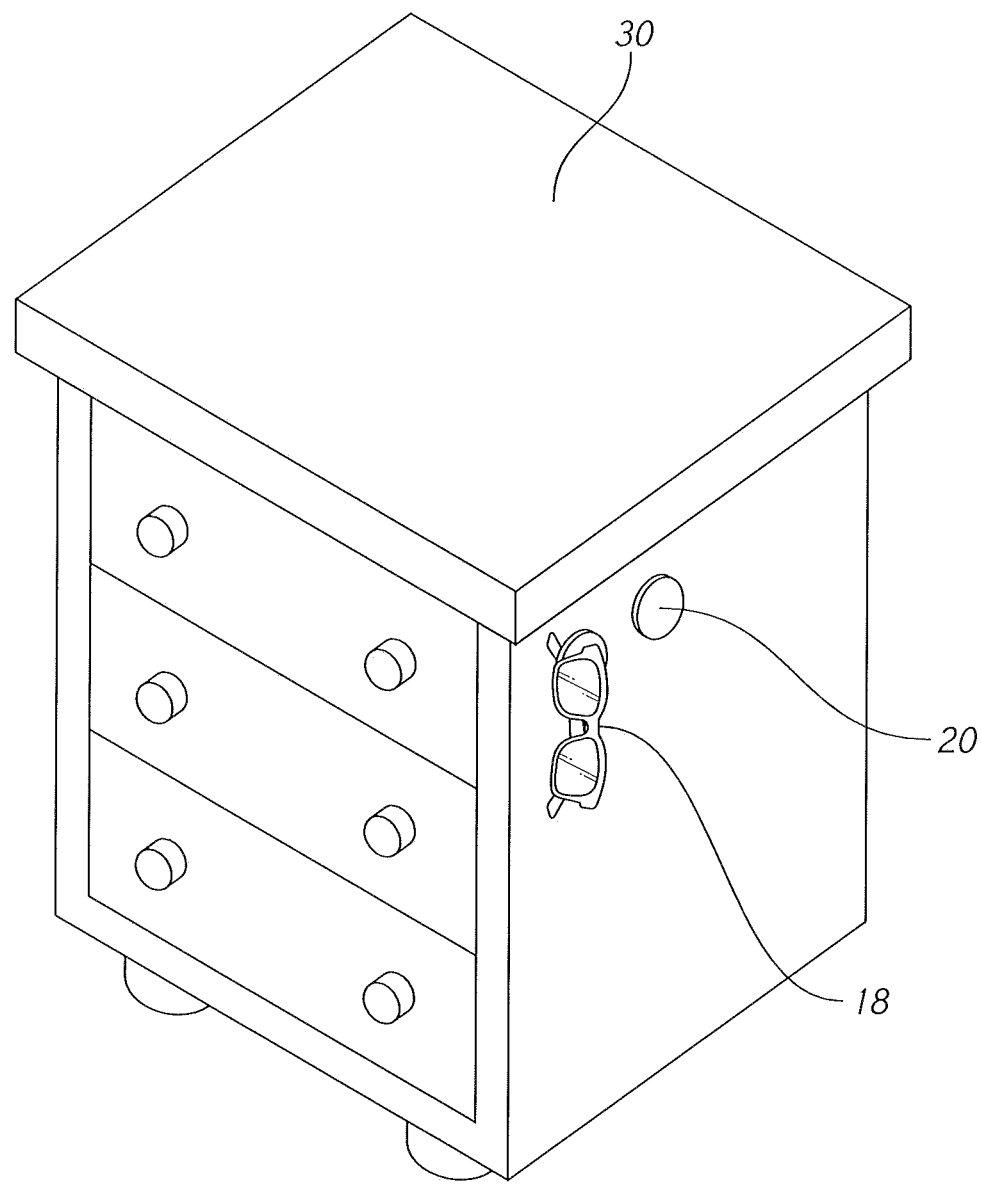
FIG. 12 is a perspective view, showing two lengths of material each having a single secondary magnet attached to a larger object (a nightstand) in an embodiment of the disclosed technology.

FIGS. 8 and 9 show an example of the present technology and method where length of material 20 is a carrying mechanism for one secondary magnet 25, having a removable non-adhesive layer 21 and adhesive back 23. A front view of length of material 20 is shown in FIG. 8. Secondary magnet 25 is secured to adhesive back 23, such that adhesive back 23 is not visible when viewing secondary magnet 25 straight on from its front (or first side). A rear view of second side of length of material 20 is shown in FIG. 9. Removable non-adhesive layer 21 can be peeled back to expose adhesive back 23 such that length of material 20 can be adhered to any larger object 30 (as shown in FIG. 12).

Figure 10:
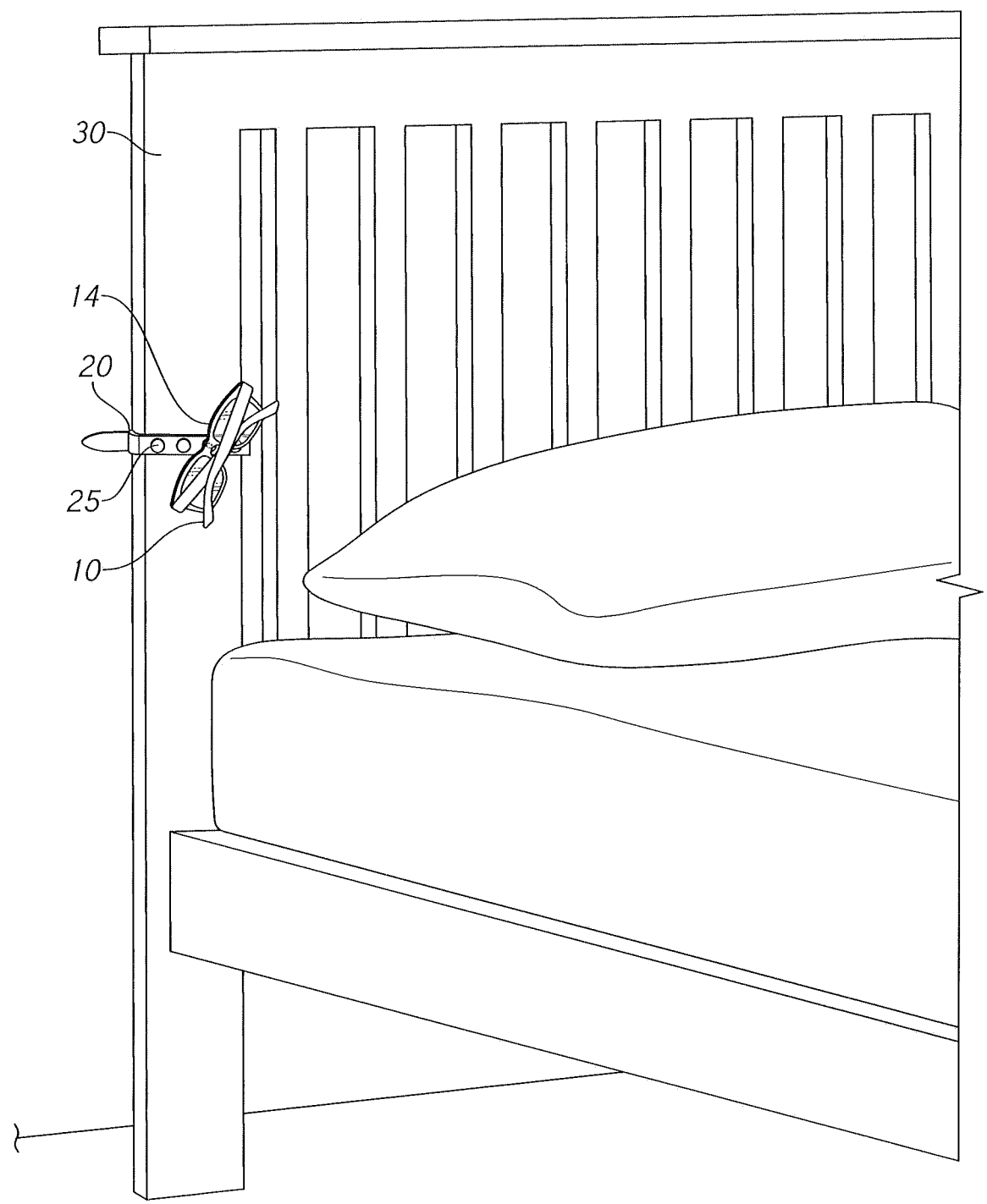
FIG. 10 is a perspective view, showing a length of material with secondary magnets attached to itself and a larger object in an embodiment of the disclosed technology.

FIG. 10 shows length of material 20 with secondary magnets 25 attached to itself and a larger object in an embodiment of the disclosed technology. Here, length of material 20 is attached to larger object 30 which in this case is a bed frame. The eyewear with its frame front 10 is held magnetically to length of material 20 by magnetic forces attracting one of secondary magnets 25 to primary magnet 14 embedded in bridge 12 of frame 18. In this manner, the front side of the glasses are facing and held next to secondary magnet 25 and/or length of material 20 which is, in turn, held to larger object 30, a bed frame. Length of material 20 in this embodiment is wrapped around a bed post and attached to itself by connecting punch hole 26 to buckle 28.

Figure 11:
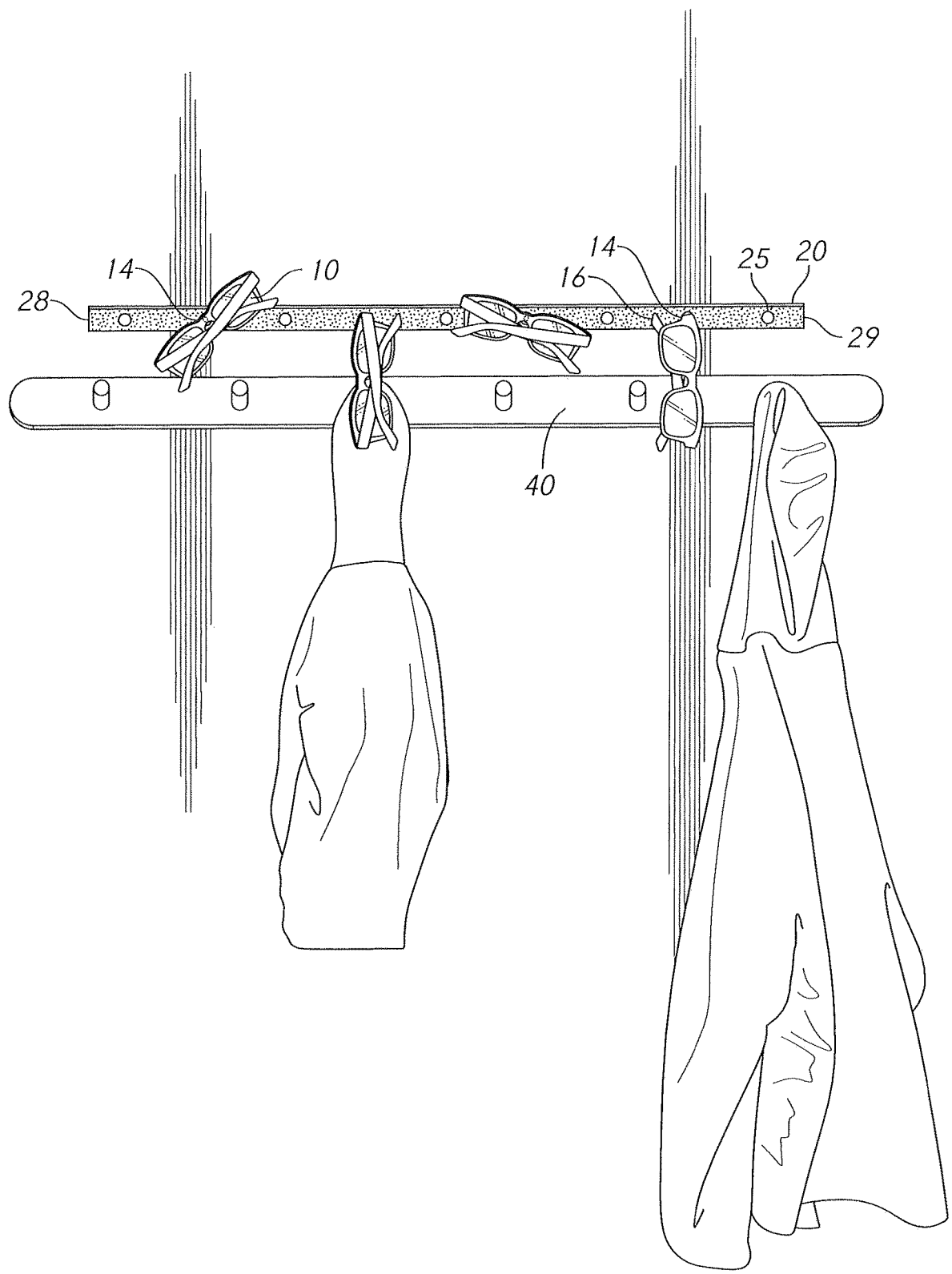
FIG. 11 is a perspective view, showing a length of material with secondary magnets adhered to a larger object (a wall) and above an organization device in an embodiment of the disclosed technology.

FIG. 11 shows length of material 20 with a series of secondary magnets 25 adhered to a larger object 30 (a wall) and above an organization device in an embodiment of the disclosed technology. Here, length of material 20 is flat/flush against a wall (a type of larger object 30) and fastened or adhered thereto by adhesive back (not shown) (or any known method of attachment). The extreme ends 28 and 29 of length of material 20 are furthest away from each other as possible given that the material is laid flat (have a front surface and back surface each respectively and substantially within their own XY plane). One can see that multiple pairs of glasses can be attached thereto, one to each secondary magnet 25 of length of material 20. The dimensions of length of material 20 can vary to fit across part or all of a length/dimension of an object to which it is attached. Thus, the dimensions of length of material 20 can accommodate a single secondary magnet or many secondary magnets.

Further, in FIG. 11 another organizing device 40 is shown which is also used to store items (in this case jackets). An organizing device is one which is used to place items in a specific position in space where they can be later retrieved, and a storage device is a device used to store objects for later retrieval. In the example shown in FIG. 11 a coat rack is shown with a plurality of pegs use to hang coats. In parallel to the coat rack, in this case, above the coat rack, is length of material 20 which is used to store the present eyewear through magnetic attachment. In this manner, the wall with organization devices used to store objects includes a place specifically to store the present eyewear.

FIG. 12 illustrates two lengths of material 20 (as shown in FIGS. 8 and 9) connected to larger object 30, in this embodiment a nightstand. Adhesive back 23 (not shown) of length of material 20 is connected to one side of larger object 30. Length of material 20 holding a single secondary magnet 25 is sleek in appearance because only secondary magnet 25 will be visible on larger object 30 when eyewear is not attached thereto (rather than multiple secondary magnets connected by portions of material). The method of using the present eyewear kit includes the steps of providing the present eyewear, providing the present length of material 20, connecting the present length of material 20 to a larger object 30 (here, a nightstand), aligning a pole of primary magnet 14 embedded in frame 18 of eyewear with a pole of secondary magnet 25 on length of material 20 such that primary magnet 14 and secondary magnet 25 magnetically engage holding outward facing vertical surface of frame 18 of eyewear to length of material 20, thereby suspending eyewear proximate larger object 30.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods, systems, and devices described herein-above are also contemplated and within the scope of the disclosed technology.

Having described my invention, I claim:

1. An eyewear kit comprising:
   at least one pair of eyewear having a frame, lenses, and at least one primary magnet embedded within said frame; and
   at least one single secondary magnet having a magnetic side and an adhesive side, opposite the magnetic side, the adhesive side having a non-adhesive layer removably secured to the adhesive side, wherein said adhesive side is configured to be attached to a freestanding object after removal of the non-adhesive layer,
   wherein said primary magnet of said frame is configured to connect magnetically to said at least one single secondary magnet.

2. The eyewear kit of claim 1, wherein said frame has a frame front, with at least one dimension and two ends, and two temples attached to said two ends of said frame front.

3. The eyewear kit of claim 2, wherein said at least one primary magnet is embedded in said frame front.

4. The eyewear kit of claim 3, wherein said primary magnet embedded within said frame front is fully covered by said frame front of said eyewear.

5. The eyewear kit of claim 2, wherein said frame front has a length, a left side, a right side and a bridge having a horizontal axis, wherein said bridge connects said left side to said right side of said frame front, and wherein said at least one primary magnet is embedded in said bridge, such that said primary magnet is oriented along said horizontal axis.

6. The eyewear kit of claim 2, wherein said primary magnet is embedded in at least one of said two temples.

7. The eyewear kit of claim 2, wherein said frame has a front side that faces away from the eyewear and a back side that faces towards the eyewear, and wherein said primary magnet is located on said front side.

8. The eyewear kit of claim 7, wherein said primary magnet within said front side is covered by said frame.

9. The eyewear kit of claim 2, wherein the at least one primary magnet is embedded within a of the frame.

10. The eyewear kit of claim 1, wherein said adhesive side of a respective secondary magnet is entirely connected to said freestanding object.

11. The eyewear kit of claim 1, wherein said at least one single secondary magnet comprises a plurality of single secondary magnets.

12. The eyewear kit of claim 1, the at least one single secondary magnet having a first side and a second side opposite the first side, wherein the magnetic side of the at least one single secondary magnetic entirely covers the first side and the adhesive side entirely covers the second side.

13. A method of organizing eyewear, comprising the steps of:
   providing at least one pair of eyewear having a weight and a frame, wherein said frame has a front and two temples, a horizontal axis, an outward facing side, an inward facing side and a primary magnet embedded within said frame, such that said primary magnet is oriented on said outward facing side of said frame;
   providing a plurality of secondary magnets, each of the plurality of secondary magnets having a magnetic side, an adhesive side, and a non-adhesive layer covering the adhesive side;
   identifying an object having a weight that is at least two times said weight of said at least one pair of eyewear;
   removing, from a first secondary magnet of the plurality of secondary magnets, said non-adhesive layer from said adhesive side to reveal the adhesive side;
   attaching said adhesive side of said first secondary magnet to said object; and
   magnetically engaging said primary magnet of said at least one pair of eyewear with said magnetic side of said first secondary magnet, such that said at least one pair of eyewear is suspended in place solely by said magnetic engagement.

14. The method of claim 13, wherein at least one side of said outward facing side of said at least one pair of eyewear faces said magnetic side.

15. The method of claim 13, wherein said primary magnet embedded within said frame is hidden by a portion of said frame.

16. The method of claim 13, further comprising:
   removing, from a second secondary magnet of the plurality of secondary magnets, said non-adhesive layer from said adhesive side; and
   attaching said adhesive side of said second secondary magnet to a second object, different from said object.

17. The method of claim 16, further comprising:
   magnetically engaging said primary magnet of said at least one pair of eyewear with said magnetic side of said second secondary magnet, such that said at least one pair of eyewear is suspended in place solely by said magnetic engagement.

18. The method of claim 13, wherein each secondary magnet is separate from the remaining secondary magnets of the plurality of secondary magnets.

19. A method organizing a plurality of eyewear on an object, comprising the steps of:
   providing a plurality of eyewear, wherein each pair of eyewear has a weight and a frame, wherein said frame has a frame front, two temples, an outward facing side, an inward facing side and a primary magnet positioned on said outward facing side of said frame;

providing a length of material having a first side and a second side, with at least one secondary magnet on said first side;

removing a non-adhesive layer from said second side of said length of material to reveal an adhesive back;

attaching, with said adhesive back, said length of material to said object; and magnetically engaging said primary magnet of each of said plurality of eyewear with a respective said at least one secondary magnet on said first side of said length of material, such that said weight of said plurality of eyewear is fully supported by said length of material when said length of material is affixed to said object.

20. The method of claim 19, wherein said step of attaching said length of material to said object is carried out by affixing substantially all of said second side of said length of material to said object.

\* \* \* \* \*